United States Patent [19]
Heimala

[11] Patent Number: 4,483,827
[45] Date of Patent: Nov. 20, 1984

[54] HYDROMETALLURGICAL PROCESS FOR THE RECOVERY OF VALUABLE METALS FROM SULFIDIC, SILICATE-CONTAINING RAW MATERIALS

[75] Inventor: Seppo O. Heimala, Pori, Finland

[73] Assignee: Outokumpu Oy, Outokumpu, Finland

[21] Appl. No.: 396,461

[22] Filed: Jul. 8, 1982

[30] Foreign Application Priority Data

Aug. 26, 1981 [FI] Finland ................... 812642

[51] Int. Cl.³ ............... C01G 3/00; C01G 53/00; C01G 9/00; C01G 45/00
[52] U.S. Cl. ............................ 423/28; 423/1; 423/49; 423/132; 423/137; 423/109; 423/150; 423/178
[58] Field of Search .............. 423/1, 658.5, 28, 49, 423/137, 109, 150, 178

[56] References Cited

U.S. PATENT DOCUMENTS 2,898,197  8/1959  Forward et al. .............. 423/1
4,192,851  3/1980  Husch et al. .............. 423/1
4,276,266  6/1981  Brum et al. .............. 423/1
4,343,773  10/1982  Miller et al. .............. 423/1

Primary Examiner—Herbert T. Carter

[57] ABSTRACT

The invention relates to a process for the recovery of valuable metals from sulfidic, silicate-containing raw materials by slurrying the raw material in water, by subjecting the slurry to a selective leach under atmospheric conditions and in an acidic milieu, and by separating the valuable-metal containing solution from the solid leach residue.

When the leach is carried out by introducing an oxygen-bearing gas into the slurry which contains finely-divided sulfide and carbon, the acidity of the slurry drops in a controlled manner so that a high efficiency of oxygen, and a high selectivity of the leach as regards valuable metals, are obtained. Owing to the presence of carbon the oxygen is reduced very easily and so oxygen efficiency is high and the rate of dissolving of the valuable metals increases in the slurry mixture.

6 Claims, 1 Drawing Figure

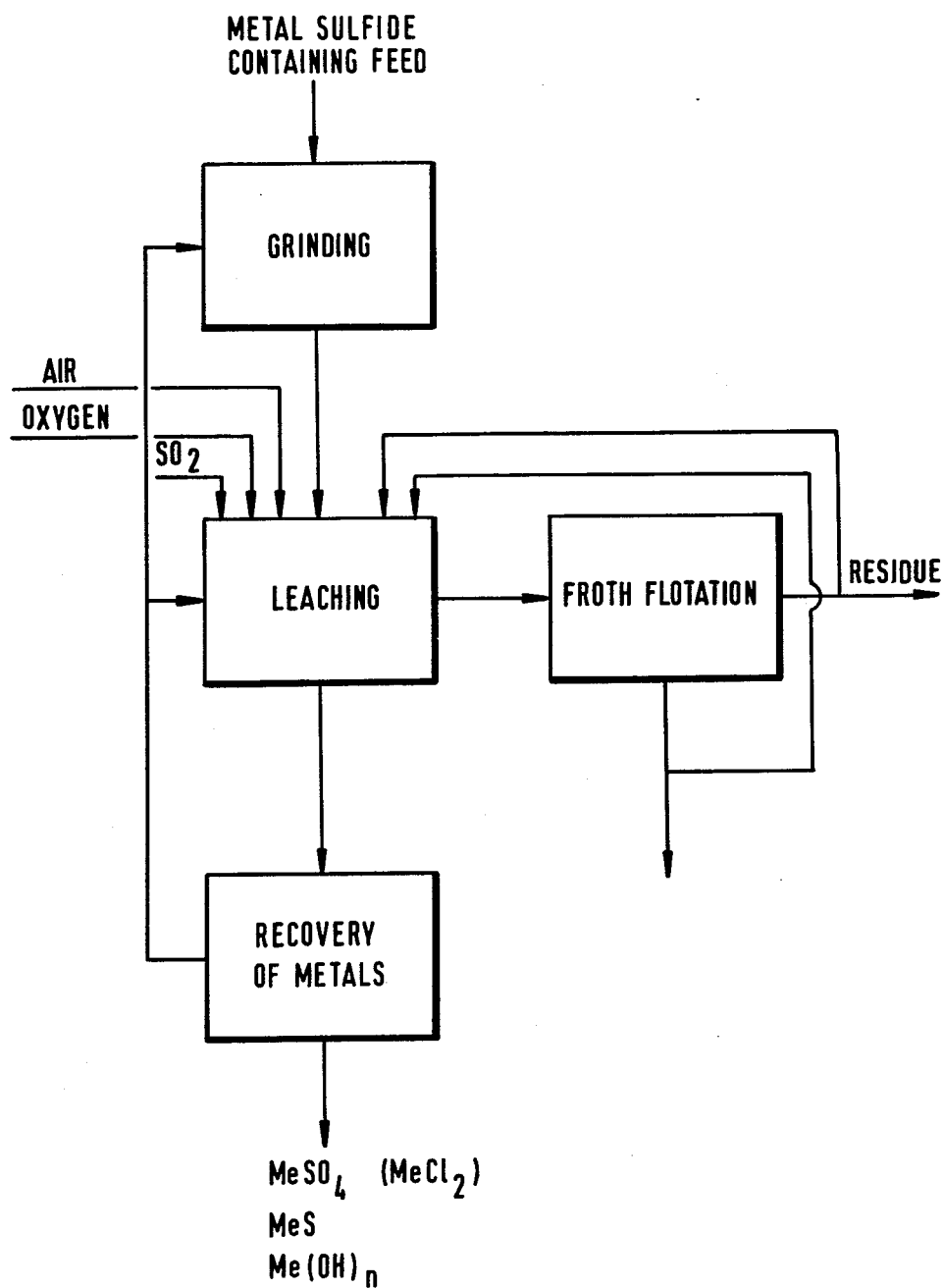

HYDROMETALLURGICAL PROCESS FOR THE RECOVERY OF VALUABLE METALS FROM SULFIDIC, SILICATE-CONTAINING RAW MATERIALS

BACKGROUND OF THE INVENTION

1. Field of the Invention

The present invention relates to a process for the recovery of valuable metals, such as nickel, copper, zinc, manganese, cobalt, aluminium and magnesium, from sulfidic silicate-containing raw materials, and in particular from low-grade sulfidic, silicate-containing ores, by slurrying in water a finely-divided raw material which contains valuable metals, by subjecting the slurry to a selective leach under atmospheric conditions and in an acidic milieu, and by separating the valuable-metal bearing solution from the solid leach residue.

By the process according to the invention, it is possible to treat ores which contain nickel, copper, zinc, iron, sulfur, silicon, manganese, cobalt, aluminium, magnesium and calcium. By the process according to the invention it is possible to treat any sulfidic, silicate-containing ores, but concentrates of nickel, zinc and copper can also be treated by the process according to the invention.

Some of the requirements set on an industrially applicable hydrometallurgical leaching process for the recovery of valuable metals present in low-grade sulfidic, silicate-containing ores are that it must be applicable on a large scale, consume little energy, be suitable in the climate in which it is used, and be non-polluting, in addition to which the process must be economical and reliable.

2. Description of the Prior Art

The process according to the invention is highly suitable for the treatment of complex sulfidic silicate-containing ores which, owing to their complex structure, it has not been earlier possible to treat satisfactorily by froth-flotation without the yields remaining low and the consumption of reagents too high. It has also been suggested that chloride solutions be used for the recovery of valuable metals from sulfidic, silicate-containing raw materials, but the disadvantages of such processes include escape of chloride, a high consumption of reagents, and problems of corrosion. It has also been suggested that ammonium salts be used for the recovery of valuable metals from sulfidic, silicate-containing raw materials, but owing to the high sulfide content of the raw material the disadvantages of such processes have included environmental hazards and poor economy. It has also been proposed that valuable metals be recovered from sulfidic, silicate-containing raw materials by means of an acid which is cycled in the process. However, the finely-divided, readily reacting silicate constituent present in the raw material renders such an acid cycle system less economical. Silicates dissolve already at a pH of 2.0-2.5, and therefore too many aluminium(III) ions dissolve in the solution, and furthermore, silicates tend to precipitate on sulfide surfaces, thereby preventing the progress of the leach and further treatment.

Low-grade ores have also been processed by so-called bacterial leaching processes, in which the cycled solution consists of an acidic (pH 0.5-1.5) ferrisulfate solution to which carbon dioxide has been added. However, economically profitable results have not so far been obtained by these processes.

SUMMARY OF THE INVENTION

The object of the present invention is thus to provide a hydrometallurgical process for the recovery of valuable metals from sulfidic, silicate-containing raw materials, which may contain, for example, nickel 0.2-0.4% by weight, copper 0.1-0.3% by weight, zinc approx. 0.5% by weight, iron 6-16% by weight, sulfur 5-15% by weight, carbon as graphite approx. 10% by weight, $SiO_2$ in the form of quartz approx. 25% by weight, $SiO_2$ in the form of silicate approx. 25% by weight, manganese approx. 3% by weight, cobalt approx. 0.02% by weight, aluminum approx. 6% by weight, magnesium approx. 4% by weight, and calcium approx. 2% by weight, e.g. black shale or similar material, in such a way that the valuable metals can be recovered economically.

The present invention is based on the surprising observation that, when a leach is carried out by directing an oxygen-bearing gas into a slurry which contains finely-divided sulfide and carbon, the acidity of the slurry decreases in a controlled manner in such a way that a high efficiency for the oxygen and a highly selective leaching of valuable metals are obtained. Because of the presence of carbon, oxygen is easily reduced, and so the efficiency of oxygen is high and the rate of dissolving of the valuable metals increases in the slurry mixture.

The leach is preferably carried out in a relatively thick slurry having a solids content of approximately 40-75% by weight. If the finely-divided, valuable-metal containing raw material already contains a sufficient amount of carbon, no carbon need be added; otherwise, finely-divided carbon is added preferably in such a quantity that the carbon content is approximately 2-15% by weight. In a preferred embodiment of the invention, the raw material which contains valuable metals, and the carbon which is possibly added to it separately, is ground to such a degree of fineness that at minimum 60% by weight of it, and preferably at maximum 95% by weight of it, has a particle size under 74 $\mu$m.

In order to make the leaching more effective, sulfur dioxide can be blown into the slurry in addition to an oxygen-bearing gas such as air, oxygen or a mixture of these. The pH of the slurry is preferably maintained at 2-4.5 during the leach, and the temperature is preferably approximately 20°-70° C.

During the leach, it is possible to separate carbon and sulfide from the slurry by means of flotation, in which case the flotation is preferably carried out without collector reagents, either by causing carbon and sulfide to rise directly by means of air, or by means of frothing agents. Carbon thus flotated can be returned to the leaching stage.

The leach is preferably carried out in a relatively high reactor, preferably over 10 meters high, e.g. 10-20 m, and the metal salt solution obtained from the reactor is treated by a process known per se for the recovery of the valuable metals from the solution, which is thereafter returned either to the grinding or the leaching stage.

BRIEF DESCRIPTION OF THE DRAWINGS

The invention is described below in greater detail, with reference to the accompanying drawing, which shows a flow diagram of a preferred embodiment of the invention.

DESCRIPTION OF THE PREFERRED EMBODIMENTS

The process according to the present invention is particularly suitable for the treatment of valuable-metal containing black shale, which in addition to sulfides of valuable metals contains la ge amounts of iron sulfides. If iron were also oxidized to sulfate during the treatment, the recovery of the valuable metals would be expensive, since the separation of nickel, zinc and cobalt from an iron sulfate solution is very difficult. The separation was previously carried out in such a way that iron was removed first and then the valuable metals were separated from the solution. If all of the iron, or most of it, dissolves, the precipitation of this iron amount requires so high an amount of neutralizing agent as to waste in the neutralizing agent the value of all of the metal present in the ore. Therefore, according to the invention the leach is carried out in such a way that the iron does not pass into the solution. In order for this to succeed nearly perfectly, the acidity and degree of oxidation of the solution must be maintained at such a level that the iron is oxidized to ferric iron and precipitates as, for example, ferritrihydroxide, i.e. that the pH of the solution must be above 2. This is necessary also for the reason that silicate minerals begin to dissolve at a lower pH, a fact which complicates the separation of the solids.

By the process according to the invention, most of the iron can be caused to react according to the following gross reaction: $FeS + 3/4 \, O_2 + 1.5 H_2O \rightarrow Fe(OH)_3 + S°$. The iron can also be precipitated in the form of other compounds, e.g. as FeOOH. The operation is usually in accordance with this gross reaction also when sulfides are leached, but in such a way that the separation of the sulfide and the oxidation and precipitation of iron are carried out in separate process stages. In the process according to the present invention, the separation of the sulfides present in black shale and the oxidation of iron are, however, carried out in one and the same process stage. Since the valuable metals are present in the form of sulfides, they can be dissolved by an oxidizing leach, in which case the metals can be caused to dissolve as sulfates, although a chloride leach is also possible.

In the process according to the present invention and depicted in the accompanying drawing, a sulfidic, silicate-containing raw material, e.g. black shale, which contains valuable metals is ground to so fine a degree that at minimum 50-70% by weight of it has a particle size under 74 μm, and is mixed with water to form a thick slurry having a solids content of 40-75% by weight, and is contacted with an oxygen-bearing gas, e.g. air and/or oxygen, in an open vessel.

At a temperature above 20° C. the rate of dissolving of sulfides increases along with the increase of the oxygen concentration of the gas, and advantageously the temperature is adjusted to 20°-70° C. when air is used. When oxygen and oxygen enrichment and high reactors, e.g. 50-150 m, are used (oxygen enriched air-oxygen), the temperature in the system can be increased by means of the heat of reaction of the system itself (primarily $S^{2-} \rightarrow SO_4^{2-}$) an open vessel even to above 100° C. The main losses of heat are due to the evaporation of water along with the gases leaving the system. The temperature is controlled by adjusting the oxygen/nitrogen ratio and by the selection of the height of the leaching reactor. Other factors which can be used to affect the heat balance include: pH, density of slurry, carbon amount, etc. The upper limit of the temperature is determined according to the hydrostatic pressure of the reactor (15 bar corresponds to 200° C. in the case of dilute solutions).

In order to speed up the leach, sulfur dioxide can be added to the slurry, determined by means of the reduction-oxidation potential in such a way that the leach takes place on the side of the anodic potential of the dissolvin sulfides (NiS, ZnS). In this case the acidity of the slurry drops, depending on, for example, the mixing speed and method, to 3.5-2.5 within a few hours to 24 hours.

It is surprising in the present invention that the acidity of a slurry which contains finely-divided sulfide and graphite (carbon) drops in a controlled manner so that the oxygen efficiency is high and the leach is highly selective with regard to valuable metals. Owing to the presence of carbon, the oxygen is easily reduced, whereby the efficiency of oxygen rises to a very high level and, consequently, the rate of didsolving also increases in a strong slurry mixture which contains an electrically conductive material in a concentration of approx. 15% by weight. Metal sulfides also dissolve at low potentials, whereupon elemental sulfur is produced instead of sulfate ions. Under the effect of carbon, the nobler sulfides also dissolve, since the number of iron-(III) ions increases. The leach can be carried out at an acidity which is above pH 2, and furthermore, it is possible to use inexpensive reactors, e.g. caves excavated in rock. In large leaching chambers there may be areas in which there is too small an amount of oxygen or similar constituents, e.g. trivalent iron, whereupon, owing to the electrical conductivity of the slurry, cementation does not occur immediately but the system has a certain reserve capacity. A leach carried out in this manner has the advantage that the carbon can be flotated half-way or near the end during the leach. In this case, also the rest of the sulfides of copper, nickel and zinc can be flotated together with the carbon concentrate, without the use of collector chemicals. At the same time the carbon can, when necessary, be introduced into the cycle. Coarser sulfide particles can further be ground before being recycled. Since carbon takes up, for example, gold, silver and platinum, it is possible by this method also to separate these valuable noble metals.

By the process according to the invention, elemental sulfur is obtained in a suitably porous form and in part stacked on the carbon, and this eliminates the passivation of sulfides due to a compact elemental sulfur layer, a phenomenon which occurs in sulfate systems and is considered deterimental. On the other hand, since sulfuric acid forms slowly in the system, for example, as the result of the oxidation of the rest of the iron sulfide, the dissolving of silicate remains slight. Most of the oxidation occurs in such a way that the iron sulfide first decomposes into trivalent iron and elemental sulfur, under the effect of carbon. Naturally, it is not possible to give a brief, precise description of the rates of dissolving of the various minerals, but it can be stated that sulfides tend to dissolve in an order determined by their stabilities.

By the process according to the invention it is possible to increase the rates of dissolving of the nobler copper, nickel and zinc sulfides with respect to the sulfides of non-noble metals, e.g. iron sulfide.

It can be observed from the results of the experiments that in systems which contain several sulfides the rate of dissolving of copper at a pH of 2-3 is increased to 2-20 times the rate it was without the addition of carbon. The increase in the rate depends, among other things, on the quality, particle size and amount of the carbon. Even though carbon is necessary, the use of excessive amounts (40% water, 20% carbon, 40% ore) is, however, not advantageous but only decreases the effective volume of the reactor.

A temperature of 20°-70° C. can be regarded as the most advantageous leaching temperature, but the leach can be carried out at any temperature between 0° and 100° C. If it is desired to recover the copper quite completely, a compromise must be made regarding the temperature, and if it is desired to recover the zinc quite completely, high temperatures must be used.

By the process according to the invention it is possible to recover valuable metals even from finely-divided pyrite, since in the process according to the invention the operation is not on the purely anodic side as regards pyrite, but the leach involves, among other things, so-called cathodic activation. In this case the potential of an individual particle of $FeS_2$, $CuFeS_2$, or the like being mixed in the slurry passes for a short period to the cathodic side as regards the particle in questions. During this, the anodic passivation layers in part disappear from the surface. The effect of the mixing is unambiguous. Dissolving is better, the better the oxidant has been dispersed into the slurry. The degree of grinding also has its effect during the mixing, for example as elemental sulfur detaches from the reacting surfaces. Grinding affects black shale in two ways. First, the normal effect of increasing the surface area, and then the effect connected with the mechanisms of dissolving. It has been observed that black shale has a three-dimensional graphite-sulfide lattice which has a relatively good electrical conductivity. If the degree of grinding is not high enough, problems spring up during the leach, for example, until all of the $Fe_{1-x}S$ has dissolved. It has been shown that if only about 20% by weight of the black shale is finer than 74 μm, this raw material cannot be caused to dissolve rapidly enough. Usually it is also not possible to obtain good yields of nickel when such a raw material is used. When black shale is ground so fine that most of it, and advantageously at least 60% by weight of it, is finer than 74 μm, the optimum range is reached. If the degree of grinding is further raised, there is the risk that the slurry is pelleted under the effect of the overgrinding, and in any case, the separation of the solids from the solution is complicated. This effect can be seen if black shale is ground to so high a degree that, for example, 95% by weight is finer than 74 μm.

In order to speed up the dissolving, sulfur dioxide, which promotes the neutralization of the alkalic constituents, can be added to the slurry in order to oxidize the iron to the trivalent state and to increase the porosity of the forming elemental sulfur. The most important thing is that the sulfur dioxide ensures a good leaching result even when a coarser sulfide material is used. The rate of dissolving can thus be increased to 1.2-2 fold. In order to speed up the total leaching process it is possible to divide the raw material to be leached into two or several fractions by known methods, e.g. magnetic separation, grading, etc.

In spite of the different rates of dissolving of the different phases, a good total leaching result is obtained for nickel, for example. Overall, it can be said that "non-noble" sulfides (FeS, MnS, etc.) in practice dissolve considerably faster than the "noble" sulfides ($CuFeS_2$, $FeS_2$, $MoS_2$, etc.). When the fractions obtained are leached separately, the most economical result is obtained. Such separate leaching also means that the less noble sulfide phases need not necessarily be leached or be totally passivated before the noblest sulfides can be reached. The quality of the solutions obtained is also better than in a joint leach. It is also to be noted that the formation of secondary sulfide decreases in the leach when corrosive activity decreases. In general, joint leaching is suitable for directly carbon-bearing raw material. This is roughly true when the concentration of FeS is less than 10% by weight and that of NiS 0.3% by weight. By using carbon and a high density of the slurry, a sufficiently high oxidizing capacity is obtained for the system even at very low oxygen pressures, when a sufficient amount of electrically conductive phase is present in the slurry. As a result, copper sulfide, $CuFeS_2$, NiS and ZnS oxidize, i.e. dissolve, before, for example, all of the FeS has reacted. And even when this is not the case, because of the good reduction efficiency of the oxygen, the consumption of oxygen is not too high when the materials here described are used. By using the process according to the invention for the treatment of black shale, a typical solution composition is obtained which contains nickel 2.5 g/l, zinc 3.0 g/l, copper 0.5 g/l, cobalt 0.1 g/l, iron 0.5 g/l, aluminum 1 g/l, $SiO_2$ 0.4 g/l. It is economically profitable to recover the valuable constituents from such a solution by methods known per se. After the removal of the valuable constituents, the mildly acid or neutral solution is returned to either grinding or to leaching.

The invention is described below in greater detail with the aid of examples.

EXAMPLE 1

A silicatic sulfide ore containing Ni 0.34% by weight (pentlandite, violarite, FeS), Cu 0.15% by weight ($CuFeS_2$), Zn 0.55% by weight (ZnS), Fe 11% by weight (approx. 6% by weight FeS, 5% by weight $FeS_2$), S 10% by weight, C 9% by weight (graphite), $SiO_2$ total 49% by weight was ground to a fineness of 94% by weight under 74 μm, and the following experiments were carried out on this material after first an aqueous slurry had been prepared which contained $H_2O$ 40% by weight and the above-mentioned ground ore 60% by weight.

(a) The slurry was placed in a small 3-liter reactor, mixed mechanically by means of a propeller at 2000 r/min, while oxygen was blown to the bottom of the reactor. The temperature was 80° C. After ten hours, the leach residue contained Ni 0.06%, Cu 0.07%, Zn 0.14%, and S° 3.2%. The pH of the solution obtained had decreased from the 5.4 of the beginning of the experiment to 2.6, and its Al concentration was 860 mg/l, $SiO_2$ 400 mg/l, and Fe 380 mg/l. Its redox potential was +380 mV vs SCE.

(b) The slurry was leached in a 5-meter-high reactor by means of air-blowing. The temperature was 40° C. The leach residue of point (a) was obtained after 8 days. The oxygen efficiency in the oxidation was on the average 9%. The difference as compared with point (a) was mainly that at the end of the experiment the pH was 3.4, whereas at its lowest during the experiment it was 2.9.

The concentration of Al in the solution was 1.1 g/l and Fe 0.8 g/l.

(c) The leach was carried out as in point (b), but in a reactor 18 m high. In this case, a leach residue similar to that of point (a) was obtained after 7 days, and the oxygen efficiency obtained was 45%, the total consumption of air being 470 Nm$^3$ air/1000 kg ore.

(d) The leach was carried out as in point (a), but at the beginning of the experiment the pH of the slurry was lowered to 1.8 by means of a $H_2SO_4$-containing solution. The $Al^{3+}$ of the solution increased to 4.5 g/l, Fe to 26 g/l and $SiO_2$ to 3.4 g/l, and the dissolving ceased when the yield of Ni was approx. 43%.

EXAMPLE 2

A sulfidic ore of which 91% was less than 74 μm and which contained, in % by weight, Cu 1.0, Zn 1.5, Pb 0.54, Fe 30.0, $S_{total}$ 33, $SiO_2$ $_{total}$ approx. 25 ($FeS_2$, $CuFeS_2$, ZnS, PbS, $Cu_{10}$ $(ZnFeCu)_2As_4S_{13}$, $Cu_{10}(Zn, Fe, Cu)_2Sb_4S_{13}$, FeAsS) was leached as a slurry as such and together with carbon in $SO_4$ and Cl systems.

(a) Leaching as a slurry (40% by weight $H_2O$) in which the pH was 2.5 (cycled solution) and which contained 10% by weight ground carbon (added) and 50% by weight the above-mentioned sulfidic ore. The leach was carried out by means of air-blowing in reactors having a diameter of 10 cm and a height of 100 cm.

After a one-week leach at 60° C., the yield of $Cu^{2+}$ was 86% and the yield of Zn 60%, and after a two-week leach, the yield of Cu was 94% and the yield of Zn 72%. The obtained solution was filtered out and the precipitate was subjected to a NaCl-HCl wash at a pH of 2.0 and at 80° C., the mixing rate being 800 r/min, for 120 min. The yield of Pb as chloride was 87%. After the chloride wash, carbon and the sulfides of Cu, Zn and Pb were flotated out from the slurry by using a small amount of light petroleum. The concentrations of Cu, Zn and Pb in the residue were in the order of 0.01–0.05%. The concentration of carbon in the residue after the leach and the flotation was 0.3%.

(b) The leach was carried out as in point (a), but without carbon (50% $H_2O$, 50% ore). After a two-week leach under otherwise similar conditions the yield of copper into the solution was 25% and that of zinc 34%.

(c) The leach was carried out otherwise as in point (a), but instead of a sulfate system the leach was carried out in a NaCl (200 g/l)-HCl system at pH 2.5. After a two-week leach the yield of Cu into the solution was 84%, of zinc 97% and of lead 96%. After filtering and a $H_2O$ wash, the residual sulfides and carbons were flotated in the manner of point (a). The results were similar to point (a).

I claim:

1. A process for the recovery of metals selected from the group consisting of nickel, copper, zinc, manganese, cobalt, aluminum and magnesium from poor complex ores containing the same as well as and sulfides and silicates, comprising—
   (a) Forming a watery slurry of said ore in finely divided form; together with finely divided carbon in an amount of from about 2 to 15% by weight of the slurry, the total solids content of said slurry being from about 40 to 75% by weight of the slurry;
   (b) Adjusting the pH of said slurry to form about 2 to 4.5;
   (c) Leaching said slurry by introducing an oxygen-containing gas and sulfur dioxide into said slurry under atmospheric conditions;
   (d) Separating carbon and metallic sulfides from said slurry by flotation induced by said oxygen-containing gas; and
   (e) Separating a metal bearing solution from the residue resulting from the aforesaid steps for recovery of the desired metal.

2. A process according to claim 1, wherein said ore and carbon are ground to a fineness such that from about 60 to 95% by weight thereof exhibits a particle size under 74 μm.

3. A process according to claim 1, wherein said oxygen-containing gas is selected from the group consisting of air and oxygen.

4. A process according to claim 3, wherein said leaching is conducted at a temperature of about 20° C.

5. A process according to claim 1, wherein carbon and sulfides are separated from said slurry by introducing to said slurry a light petroleum fraction.

6. A process according to claim 1, further comprising separating said carbon from said slurry by flotation and recycling the same to said slurry.

* * * * *